(12) United States Patent
Grace

(10) Patent No.: US 8,746,127 B2
(45) Date of Patent: Jun. 10, 2014

(54) VALVE RETURN SPRING WITH FILTER SUPPORT FOR A PNEUMATIC BRAKE BOOSTER ASSEMBLY

(75) Inventor: William P. Grace, Granger, IN (US)

(73) Assignee: Robert Bosch GmbH, Stuttgart (DE)

( * ) Notice: Subject to any disclaimer, the term of this patent is extended or adjusted under 35 U.S.C. 154(b) by 833 days.

(21) Appl. No.: 12/941,444

(22) Filed: Nov. 8, 2010

(65) Prior Publication Data
US 2012/0111184 A1   May 10, 2012

(51) Int. Cl.
*F15B 9/10*   (2006.01)

(52) U.S. Cl.
USPC .......................................................... 91/376 R

(58) Field of Classification Search
USPC ...................................................... 91/376 R
See application file for complete search history.

(56) References Cited

U.S. PATENT DOCUMENTS

| | | | |
|---|---|---|---|
| 4,453,452 A * | 6/1984 | Meynier ...................... | 91/376 R |
| 4,622,882 A * | 11/1986 | Bischoff et al. ............. | 91/376 R |
| 5,249,504 A | 10/1993 | Gautier et al. | |
| 5,279,203 A | 1/1994 | Gautier et al. | |
| 5,528,975 A | 6/1996 | Gautier et al. | |
| 5,787,788 A * | 8/1998 | Gautier et al. ............... | 91/376 R |
| 5,826,484 A * | 10/1998 | Gautier et al. ............... | 91/376 R |
| 5,848,827 A * | 12/1998 | Levrai .......................... | 91/376 R |
| 6,324,958 B1 | 12/2001 | Ikeda | |
| 6,477,935 B1 | 11/2002 | Schonlau et al. | |
| 2004/0139849 A1 | 7/2004 | Fellinger et al. | |

FOREIGN PATENT DOCUMENTS

| | | |
|---|---|---|
| FR | 2731668 A1 | 9/1996 |
| GB | 2142104 A | 1/1985 |

OTHER PUBLICATIONS

European Search Report in corresponding European application (i.e., EP 11 18 8209), completed Mar. 14, 2012 (5 pages).

* cited by examiner

*Primary Examiner* — Michael Leslie
(74) *Attorney, Agent, or Firm* — Maginot, Moore & Beck

(57) ABSTRACT

A brake system includes a vacuum booster, a valve positioned within the vacuum booster, the valve including a valve member connected to a rod, the rod configured to move in a linear direction, an air filter positioned within the vacuum booster, and a return spring positioned within the vacuum booster. The return spring includes a first end and a second end with a plurality of coils extending between the first end and the second end. The first end includes a first coil and a second coil positioned radially outward from the first coil, and the first coil is configured to contact the rod and the second coil is configured to support the filter.

19 Claims, 4 Drawing Sheets

VALVE RETURN SPRING WITH FILTER SUPPORT FOR A PNEUMATIC BRAKE BOOSTER ASSEMBLY

FIELD OF THE INVENTION

The present disclosure relates generally to hydraulic braking systems, and in particular to a pneumatic brake booster for a hydraulic braking system.

BACKGROUND OF RELATED ART

Vehicles often include a hydraulic braking system that is configured to reduce the speed of the vehicle and/or maintain the vehicle in a stopped position. Hydraulic braking systems include a master cylinder fluidly coupled to one or more hydraulic cylinders. The master cylinder includes an input shaft, which activates the hydraulic cylinders in response to the input shaft moving in a braking direction. Typically, the input shaft is moved in the braking direction when a user depresses a foot pedal. Each activated hydraulic cylinder moves one or more brake pads against a drum, rotor, or other rotating element to brake the vehicle. Releasing pressure upon the foot pedal, such that the foot pedal moves in a release direction to a deactivated position, causes the input shaft to move in the release direction, which deactivates the hydraulic cylinders and permits the drum, rotor, or other rotating elements to rotate freely.

To reduce the force applied to the foot pedal when braking the vehicle, most hydraulic braking systems are supplemented with a pneumatic brake booster. Specifically, some users find that moving a master cylinder input shaft that is coupled directly to a foot pedal requires the user to impart a force upon the foot pedal that is greater than that which may be comfortably and repetitively applied. To this end, the pneumatic brake booster amplifies the force exerted on the foot pedal such that a user may move the input shaft of the master cylinder with correspondingly less force being exerted on the foot pedal.

In general, the pneumatic brake booster includes a housing, a valve shaft, a shell, a diaphragm supported by a plate, a valve, a filter, and an output shaft to the master cylinder. The diaphragm and plate are connected to the input shaft of the master cylinder, the housing, and the shell. The diaphragm divides an internal cavity of the shell into a booster chamber and a vacuum chamber. The valve separates the booster chamber into an atmosphere chamber and a working chamber. A vacuum side of the diaphragm forms a portion of the vacuum chamber and a working side of the diaphragm forms a portion of the working chamber. Vacuum generated by a gasoline engine or a vacuum pump is coupled to the vacuum chamber, such that the vacuum chamber is maintained at a pressure less than the atmospheric pressure. The valve shaft, which is coupled to the valve and the brake pedal, is configured to open the valve in response to the brake pedal moving in the braking direction. The valve closes in response to the brake pedal moving in the release direction.

When the valve is closed, vacuum is supplied to the working chamber, such that the working chamber and the vacuum chamber are maintained at the same pressure level. Accordingly, the approximately equal pressure on each side of the diaphragm causes the diaphragm to remain stationary.

When a force is exerted upon the brake pedal, the booster amplifies the force, such that the input shaft of the master cylinder is more easily moved. In particular, exerting a force on the brake pedal causes the valve to open. As a result, air from the atmosphere is drawn into the atmosphere chamber, through the filter and the valve, and into the working chamber. The imbalance of pressures between the vacuum chamber and the working chamber tends to move the diaphragm, the plate, the valve shaft, the housing, and the input shaft of the master cylinder in the braking direction. Accordingly, the imbalance of pressure amplifies the force exerted upon the brake pedal making the braking system easier to operate.

Common to all components of a braking system is the need for reliable operation. Accordingly, there is a continuing need in the art to provide a reliable pneumatic brake booster.

SUMMARY

In accordance with one embodiment of the present disclosure, there is provided a brake booster comprising a filter and a return spring. The return spring comprises a plurality of coils including a dead coil at an end of the return spring configured to support the filter.

In accordance with another embodiment of the present disclosure, there is provided a brake system comprising a vacuum booster, a valve, an air filter, and a return spring. The valve is positioned within the vacuum booster. The valve includes a valve member connected to a rod, and the rod is configured to move in a linear direction. The air filter is positioned within the vacuum booster. The return spring is positioned within the vacuum booster. The return spring comprises a first end and a second end with a plurality of coils extending between the first end and the second end, wherein the first end includes a first coil and a second coil positioned radially outward from the first coil. The first coil is configured to contact the rod and the second coil is configured to support the filter.

In accordance with yet another embodiment of the present disclosure, there is provided a pneumatic brake booster for a brake system, comprising a housing, a valve member, a valve seat, a first spring seat, a filter, a valve rod, and a return spring. The housing defines an atmosphere chamber and a rod passage into the atmosphere chamber. The valve member is located within the housing. The valve seat is located within the housing and defines a valve opening. The atmosphere chamber extends to the valve opening. The first spring seat is positioned within the atmosphere chamber. The filter is at least partially positioned in the atmosphere chamber. The valve rod is coupled to the valve member. The valve rod (i) extends into the atmosphere chamber through the rod passage and (ii) defines a second spring seat on a portion of the valve rod positioned in the atmosphere chamber. The return spring is positioned within the atmosphere chamber and includes a live coil portion and a dead coil portion. The live coil portion (i) extends between the first spring seat and the second spring seat and (ii) is configured to bias the valve rod toward the rod passage, wherein at least a portion of the dead coil portion contacts the filter in a manner that supports the filter within the housing.

BRIEF DESCRIPTION OF THE FIGURES

Features of the present invention will become apparent to those of ordinary skill in the art to which this device pertains from the following description with reference to the figures, in which.

DETAILED DESCRIPTION

For the purpose of promoting an understanding of the principles of the device described herein, reference will now be made to the embodiment(s) illustrated in the figures and described in the following written specification. It is understood that no limitation to the scope of the device is thereby intended. It is further understood that the device includes any alterations and modifications to the illustrated embodiment(s) and includes further applications of the principles of the device as would normally occur to one of ordinary skill in the art to which this device pertains.

Figure 1:
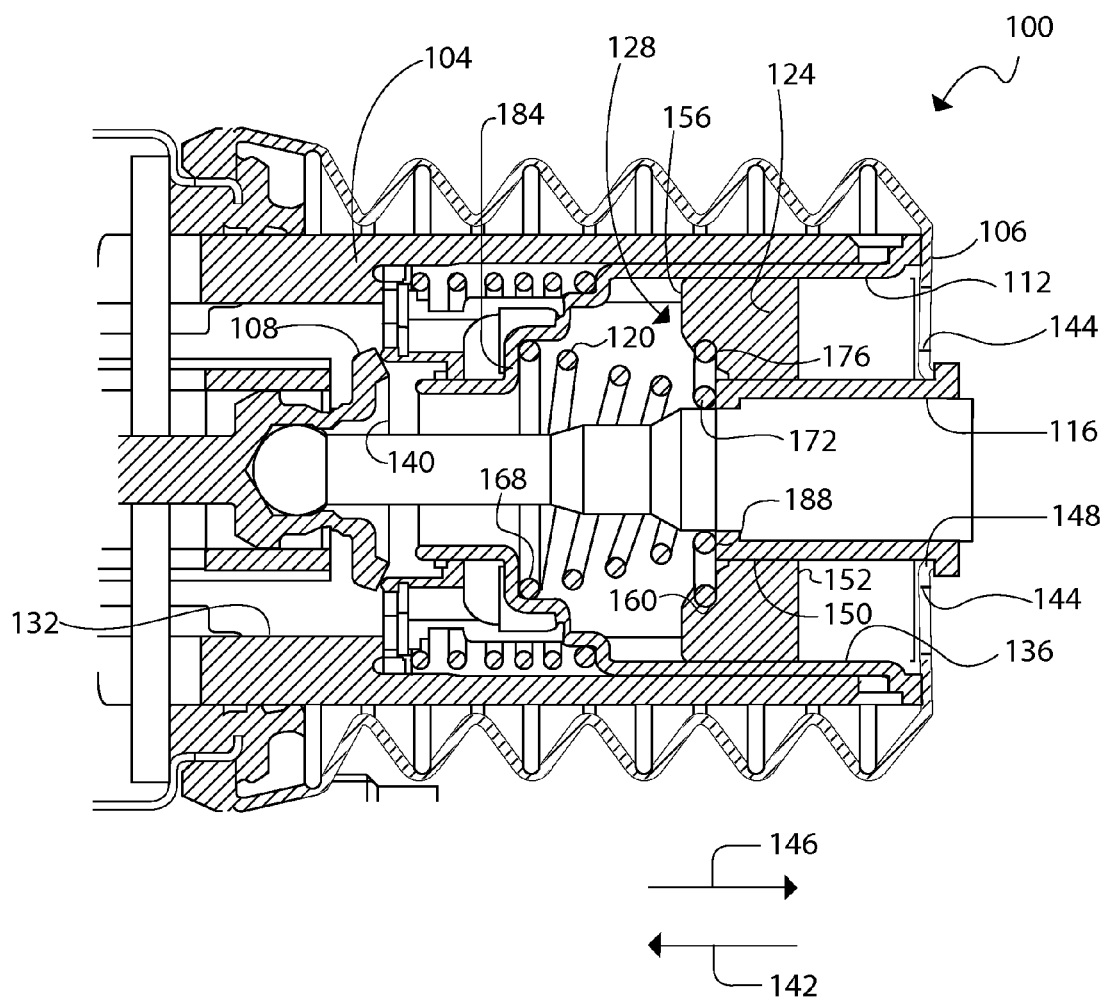
FIG. 1 is a cross sectional view of a portion of a pneumatic brake booster including a return spring configured to support a filter.

As shown in FIG. 1, a pneumatic/vacuum brake booster 100, includes a housing 104, an end cap 106, a valve member 108, a sleeve 112, a control rod 116, a control rod return spring provided as a return spring 120, and an air filter 124. The housing 104 is connected to a diaphragm (not illustrated) of the vacuum booster 100 in the normal manner and defines an atmosphere chamber 128 and at least a portion of a working chamber 132. The end cap 106 caps an inlet side 136 of the housing 104. Inlets 144 are formed in the end cap 106 to enable air to enter the atmosphere chamber 128. The sleeve 112 is slidably positioned within the atmosphere chamber 128 and is biased toward the end cap 106 by the spring 120.

The valve 108 is positioned within the working chamber 132 and is configured to mate with a valve seat 140. The valve seat 140 defines a valve opening and separates the working chamber from the atmosphere chamber 128. The control rod 116 extends through the opening in the valve seat 140 and a rod passage 148 in the end cap 106. The control rod 116 is received by the valve 108, and the control rod and the valve move together in a linear direction within the housing 104. An end of the control rod 116 opposite the valve 108 is coupled to a brake pedal (not illustrated) in a manner known by those of ordinary skill in the art. The return spring 120 is positioned in the atmosphere chamber 128 and is configured to contact the control rod 116 and to bias the control rod in a release direction 146. Accordingly, the return spring 120 also biases the valve 108 against the valve seat 140, which fluidly decouples the atmosphere chamber 128 from the working chamber 132. The filter 124 is positioned in the atmosphere chamber 128 and is configured to filter air drawn into the atmosphere chamber 128.

The filter 124 includes an opening 150, an input side 152, an output side 156, and a coil seat 160. The filter 124 removes particulate matter from the air drawn into the atmosphere chamber 128 as the air moves from the input side 152 to the output side 156. The coil seat 160, which is formed in the output side 156, receives at least a portion of one of the dead coils 176 (FIG. 2) of the spring 120. The opening 150 in the filter 124 receives and engages the rod 116, and the exterior periphery of the filter contacts the sleeve 112 and/or the housing 104 such that the air drawn through the inlets 144 passes through the filter. The filter 124 prevents air from being drawn around the filter and passing through the valve seat 140 in an unfiltered state. The filter 124 may be constructed of materials suitable for filtering air, such as polyurethane foam, paper, felt, and/or other suitable materials known to those of ordinary skill in the art. The filter 124, as shown in FIG. 1, includes a generally circular outer periphery, which is seated against the interior periphery of the sleeve 112. Alternatively, the filter 124 may have any exterior periphery that permits the filter to seal against a correspondingly shaped sleeve and/or housing.

The spring 120 contacts the filter 124 to maintain the position of the filter during operation of the brake booster 100. Specifically, in response to the rod 116 moving in a braking direction 142 (FIG. 1) the valve 108 becomes unseated from the valve seat 140 and air is drawn into the working chamber 132 through the filter 124. As air moves through the working chamber 132, it is desirable to prevent the airflow from displacing the filter 124. A sufficient airflow may cause the filter 124 to be drawn toward the working chamber 132 if the filter is unsupported, in which case some unfiltered air would bypass the filter and enter the working chamber. Accordingly, many known boosters include a dedicated filter support member which is coupled to the control rod and is disposed between the return spring and the filter. These dedicated filter supports may increase the cost and assembly time of the booster. Instead of a dedicated filter support, the booster 100 of the present disclosure utilizes a return spring 120, which includes one or more dead coils 176 (FIG. 2) that are configured to maintain the position of the filter 124. The spring 120 may be configured such that one or more dead coils 176 contact the filter 124 to maintain the position of the filter. Alternatively, the spring 120 may be configured such that only a portion of one dead coil 176 contacts the filter 124 to maintain the position of the filter. The return spring 120 with dead coils, therefore, supports the filter 124, eliminates the dedicated filter support, and has the potential to reduce the overall cost and assembly time of the booster 100.

Figure 2:
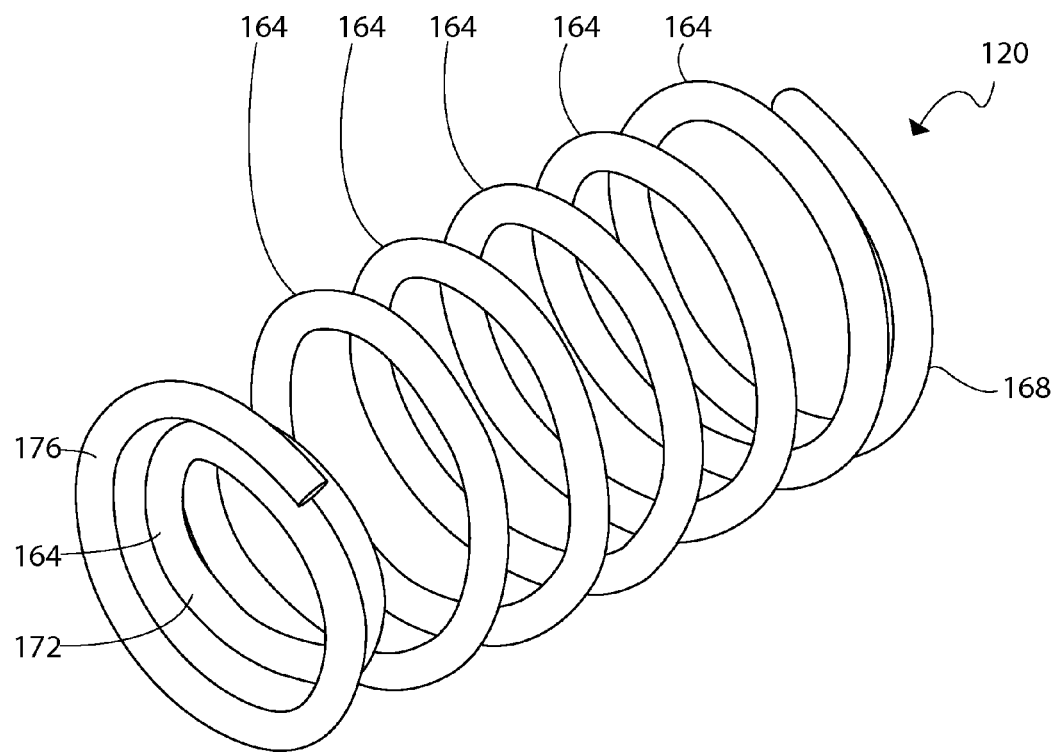
FIG. 2 is a perspective view of the return spring of FIG. 1.
Figure 3:
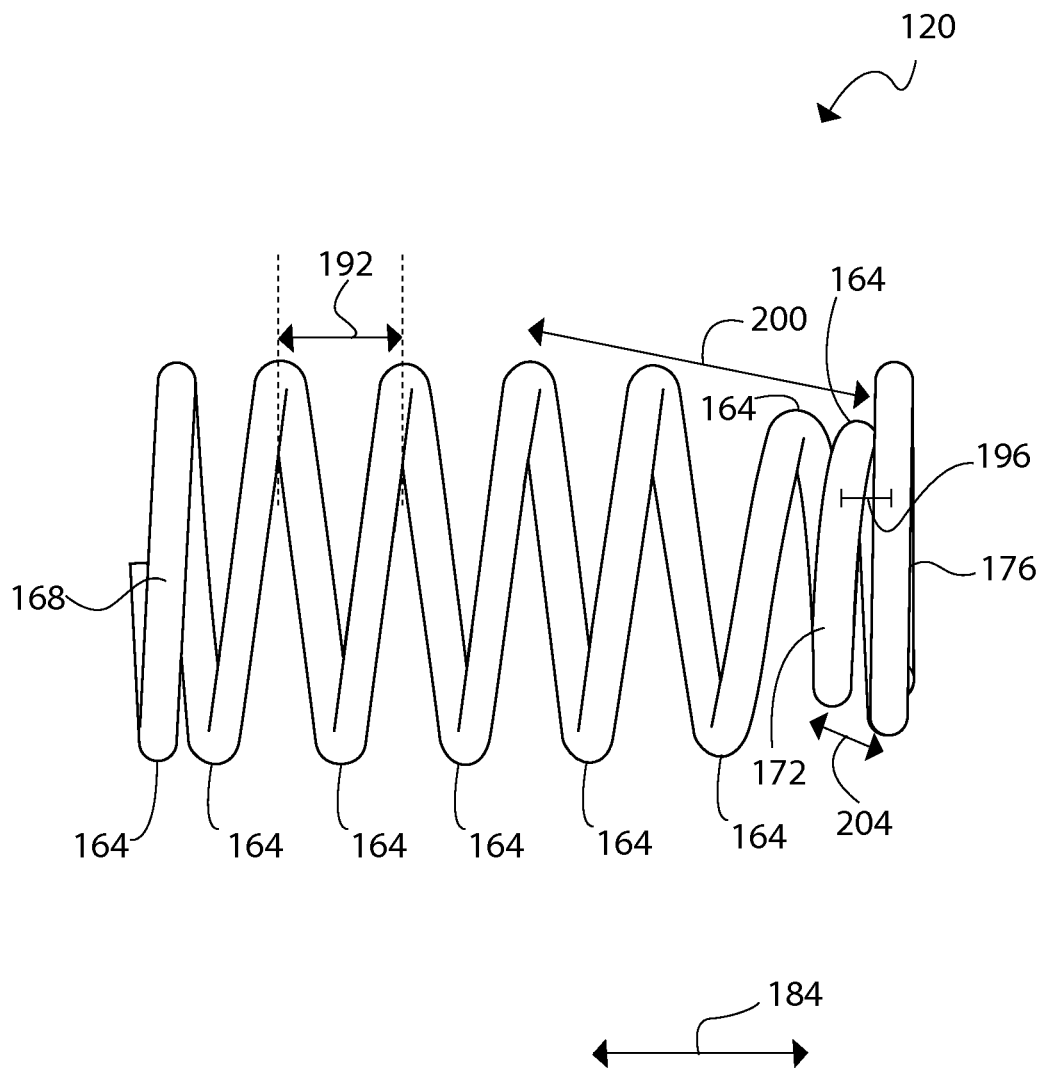
FIG. 3 is an elevational side view of the return spring of FIG. 1.

As shown in FIGS. 2 and 3, the return spring 120 includes live coils 164 extending between and including a first end coil 168 and a second end coil 172. Additionally, the return spring 120 includes at least one dead coil 176 at an end of the return spring. In the illustrated embodiment, the dead coil 176 is positioned radially outward from the second end coil 172. In another embodiment, the dead coil 176 may have a slight pitch, in addition to being positioned radially outward from the second end coil 172. In such an embodiment, the stiffness (i.e. the spring coefficient) of the dead coil 176 is low enough to enable the dead coil to become flat when the dead coil is positioned within the brake booster 100. In the embodiment of FIGS. 2 and 3, only one dead coil 176 is shown. Of the live coils 164 and the dead coil 176 only the live coils contribute to the generation of a spring force. In particular, movement of the live coils 164 relative to each other generates a force approximately parallel to the direction 146 (FIG. 1). Movement of the live coils 164 is generally caused by movement of the input rod 116. The dead coil 176, however, remains stationary relative to the second end coil 172 in response to movement of the live coils 164. Other embodiments of the return spring 120 may include additional dead coils positioned between the second end coil 172 and the dead coil 176.

With reference again to FIG. 1, the first end coil 168 is seated in a spring seat 184 defined in the sleeve 112, and the second end coil 172 is seated in a spring seat 188 defined in the control rod 116. The spring seat 184 is a notch or step formed in the sleeve 112, and the spring seat 188 is a shoulder or ridge of the rod 116. Each end coil 168, 172 remains seated in a respective one of the spring seats 184, 188 as the control rod 116 moves. Embodiments, of the booster 100 without a sleeve 112 may include a spring seat formed in the housing 104 to support the first end coil 168, in which case the spring seat formed in the housing remains stationary as the rod 116 moves relative to the housing.

The structure of the spring 120 enables the spring to both bias the control rod 116 and also to support the filter 124. To this end, the dead coil 176 is positioned radially outward and is at least partially coplanar with the second end coil 172, as shown in FIGS. 1 and 3 by the overlap of the dead coil 176 with the second end coil 172. Additionally, the live coils 164 exhibit a greater pitch than the dead coil 176, as identified by the reference line 192 and the reference line 196 of FIG. 3.

Figure 4:
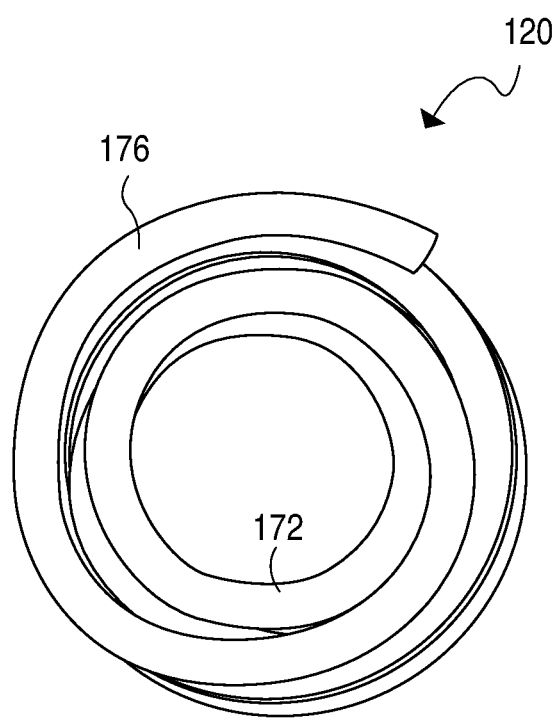
FIG. 4 is an elevational end view of the return spring of FIG. 1.

Spring pitch, as known to those of ordinary skill in the art, refers to the distance between adjacent coils. The pitch between the dead coil 176 and the second end coil 172 places the dead coil 176 in a position to contact the filter 124. Furthermore, the spring 120 exhibits a lesser taper between the first end coil 168 and the second end coil 172 and a greater taper between the second end coil 172 and the dead coil 176, as identified by the reference line 200 and the reference line 204 of FIG. 3. As a result, and as shown in FIGS. 1 and 3, a diameter of the first end coil 168, is greater than a respective diameter of the second end coil 172. As shown in FIG. 4, the diameter of the second end coil 172 is less than the diameter of the dead coil 176. The taper of the dead coil 176 places the dead coil in a position to contact the filter 124.

With reference to FIG. 1, at least a portion of the dead coil 176 is received by the coil seat 160 of the filter 124, such that the dead coil 176 supports and positions the filter in the atmosphere chamber 128. In the disclosed embodiment, the dead coil 176 contacts the filter 124 directly without a separate filter support structure being inserted between the filter and the dead coil. As such, the dead coil 176 does not reduce the airflow through the filter 124, because only a portion of the surface area of the output side 156 is obstructed by the dead coil.

In operation, the return spring 120 biases the rod 116 and supports and stabilizes the filter 124. When the booster 100 is activated by moving the control rod 116 against the force of the spring 120, the filter 124 moves with the rod, such that the outer periphery of the filter slides along the inner periphery of the sleeve 112. As the rod 116 opens the valve 108, air is drawn through the filter 124 and the valve seat 140. The dead coil 176 prevents the filter from becoming dislodged or otherwise moving as a result of the motion of the rod 116 and the airflow through the valve seat 140. In particular, the airflow tends to force the filter 124 against the dead coil 176 (or a portion thereof), which has sufficient rigidity to remain in a fixed position relative to the rod 116 in response to the airflow through the atmosphere chamber 128. When the booster 100 is deactivated, the live coils 164 of the spring 120 bias the valve 108 against the valve seat 140 and move the control rod 116 in the direction 146. The dead coil 176 contacts the filter 124 and causes the filter to move with the rod 116 back to the position illustrated in FIG. 1. The dead coil 176 prevents any portion of the filter 124 from becoming positioned between the live coils 164, including the live coils between the first end coil 168 and the second end coil 172, which may be referred to as intermediate coils.

The device described herein has been illustrated and described in detail in the figures and foregoing description, the same should be considered as illustrative and not restrictive in character. It is understood that only the preferred embodiments have been presented and that all changes, modifications, and further applications that come within the spirit of the device described herein are desired to be protected.

What is claimed is:

1. A brake booster comprising:
   a filter; and
   a return spring comprising a plurality of coils including a dead coil at an end of the return spring configured to restrain movement of the filter.

2. The brake booster of claim 1 wherein the plurality of coils further includes a live coil at the end of the return spring and the dead coil is positioned radially outward from the live coil.

3. The brake booster of claim 1 wherein the dead coil contacts the filter.

4. The brake booster of claim 1 wherein no filter support member is disposed between the return spring and the filter.

5. The brake booster of claim 1 wherein the return spring is a control rod return spring.

6. The brake booster of claim 5 wherein:
   the brake booster includes a control rod configured to move in a linear direction, and
   the end of the return spring configured to restrain movement of the filter includes a live coil in contact with the control rod.

7. The brake booster of claim 6 wherein an opposite end of the return spring is in contact with a spring seat that is stationary when the control rod moves in the linear direction.

8. A brake system comprising:
   a vacuum booster;
   a valve positioned within the vacuum booster, the valve including a valve member connected to a rod, the rod configured to move in a linear direction;
   an air filter positioned within the vacuum booster; and
   a return spring positioned within the vacuum booster, the return spring comprising a first end and a second end with a plurality of coils extending between the first end and the second end, wherein the first end includes a first coil and a second coil positioned radially outward from the first coil, the first coil configured to contact the rod and the second coil configured to support the filter.

9. The brake system of claim 8 wherein the second coil contacts the filter and no filter support member is positioned between the second coil and the filter.

10. The brake system of claim 8 wherein at least part of the first coil and the second coil are partially coplanar.

11. The brake system of claim 8 wherein the second end of the return spring is in contact with a sleeve positioned within the vacuum booster.

12. The brake system of claim 8 wherein the filter and return spring are positioned in an atmosphere chamber in a housing of the vacuum booster.

13. The brake system of claim 12 wherein the filter is at least partially positioned between the second coil and an air inlet in the housing.

14. A pneumatic brake booster for a brake system, comprising:
   a housing defining an atmosphere chamber and a rod passage into the atmosphere chamber;
   a valve member located within the housing;
   a valve seat located within the housing and defining a valve opening, the atmosphere chamber extending to the valve opening;
   a first spring seat positioned within the atmosphere chamber;
   a filter at least partially positioned in the atmosphere chamber;
   a valve rod coupled to the valve member, the valve rod (i) extending into the atmosphere chamber through the rod passage and (ii) defining a second spring seat on a portion of the valve rod positioned in the atmosphere chamber; and
   a return spring positioned within the atmosphere chamber, the return spring including a live coil portion and a dead coil portion, the live coil portion (i) extending between the first spring seat and the second spring seat and (ii) configured to bias the valve rod toward the rod passage, wherein at least a portion of the dead coil portion contacts the filter in a manner that supports the filter within the housing.

15. The pneumatic brake booster for a brake system of claim 14, wherein
the valve rod is movable between a first position and a second position,
the live portion of the return spring includes a plurality of live coils, and
the dead coil portion prevents the filter from moving between one or more of the live coils and an intermediate coil in response to the valve rod moving between the first position and the second position.

16. The pneumatic brake booster for a brake system of claim 15, wherein the filter is configured to filter air drawn into the atmosphere chamber in response to the valve rod being in the second position.

17. The pneumatic brake booster for a brake system of claim 14, wherein
the live coil portion of the return spring includes (i) a first end coil having a first diameter and (ii) a second end coil having a second diameter,
the dead coil portion includes a third end coil having a third diameter,
the first diameter being greater than the second diameter, and
the second diameter being less than the third diameter.

18. The pneumatic brake booster for a brake system of claim 17, wherein the return spring exhibits (i) a first pitch between the first end coil and the second end coil and (ii) a second pitch between the second end coil and the third end coil.

19. The pneumatic brake booster for a brake system of claim 17, wherein the return spring exhibits (i) a first taper between the first end coil and the second end coil and (ii) a second taper between the second end coil and the third end coil.

* * * * *